(12) United States Patent
Hanrahan et al.

(10) Patent No.: US 11,193,425 B2
(45) Date of Patent: Dec. 7, 2021

(54) GEARBOX FOR BOOST SPOOL TURBINE ENGINE

(71) Applicant: Raytheon Technologies Corporation, Farmington, CT (US)

(72) Inventors: Paul R. Hanrahan, Farmington, CT (US); Arthur M. Salve, Jr., Tolland, CT (US); Daniel Bernard Kupratis, Wallingford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 229 days.

(21) Appl. No.: 16/445,469

(22) Filed: Jun. 19, 2019

(65) Prior Publication Data

US 2020/0400078 A1 Dec. 24, 2020

(51) Int. Cl.
*F02C 7/36* (2006.01)
*F02C 7/32* (2006.01)
*F02C 6/08* (2006.01)

(52) U.S. Cl.
CPC ............ *F02C 7/36* (2013.01); *F02C 7/32* (2013.01); *F02C 6/08* (2013.01); *F05D 2260/4023* (2013.01); *F05D 2260/40311* (2013.01)

(58) Field of Classification Search
CPC .... F02C 7/32; F02C 7/36; F02C 7/268; F02C 7/275; F02C 7/277; F05D 2260/40311; F05D 2220/50
See application file for complete search history.

(56) References Cited

U.S. PATENT DOCUMENTS

| 1,356,601 | A | * | 10/1920 | Couse | F16H 48/08 475/30 |
| 1,435,473 | A | * | 11/1922 | Isaacson | F16H 48/24 475/233 |
| 1,689,751 | A | * | 10/1928 | Rengler | F16H 48/08 475/9 |
| 1,902,374 | A | * | 3/1933 | Pirinoli | F16H 1/2854 475/332 |
| 2,196,368 | A | * | 4/1940 | Thomson | F16H 48/11 475/6 |
| 3,673,797 | A | * | 7/1972 | Wilkinson | F02D 25/00 60/600 |
| 3,872,741 | A | * | 3/1975 | Berchtold | F16H 48/08 475/246 |
| 4,095,675 | A | * | 6/1978 | Bell | F16H 3/64 184/6.12 |
| 4,542,722 | A | * | 9/1985 | Reynolds | F02B 67/04 123/179.19 |

(Continued)

OTHER PUBLICATIONS

International Search Report and Written Opinion for International Application No. PCT/US20/38348 dated Sep. 3, 2020.

*Primary Examiner* — Alain Chau
(74) *Attorney, Agent, or Firm* — Carlson, Gaskey & Olds, P.C.

(57) ABSTRACT

A turbine engine includes a core engine including a first spool and a second spool rotatable about a main engine longitudinal axis, a boost spool powered by a secondary drive system, and an accessory gearbox coupled to the core engine and the boost spool. A differential gear system is coupled between the core engine, the boost spool and the accessory gearbox for distributing power between the boost spool, the core engine and the accessory gearbox.

13 Claims, 5 Drawing Sheets

(56) References Cited

U.S. PATENT DOCUMENTS

| | | | | |
|---|---|---|---|---|
| 4,572,961 A * | 2/1986 | Borger | ................ | H02P 29/0016 |
| | | | | 290/1 R |
| 5,039,281 A * | 8/1991 | Johnston | ................... | F04B 9/02 |
| | | | | 417/212 |
| 5,107,951 A * | 4/1992 | Kawamura | ............ | B60K 17/24 |
| | | | | 180/233 |
| 6,527,665 B1 * | 3/2003 | Muto | ........................ | F16H 3/72 |
| | | | | 475/336 |
| 7,168,913 B2 | 1/2007 | Lardellier | | |
| 7,351,174 B2 * | 4/2008 | Beutin | ....................... | F02C 7/36 |
| | | | | 475/6 |
| 7,481,062 B2 * | 1/2009 | Gaines | ...................... | F02K 3/06 |
| | | | | 60/792 |
| 7,805,947 B2 | 10/2010 | Moulebhar | | |
| 7,882,691 B2 * | 2/2011 | Lemmers, Jr. | ........... | F02C 7/275 |
| | | | | 60/39.163 |
| 8,117,827 B2 | 2/2012 | Wollenweber et al. | | |
| 8,146,370 B2 | 4/2012 | Zeiner et al. | | |
| 8,424,280 B2 | 4/2013 | Moore et al. | | |
| 8,500,583 B2 * | 8/2013 | Goi | ........................ | F02C 7/275 |
| | | | | 475/5 |
| 8,690,099 B2 * | 4/2014 | Burns | ....................... | F02C 7/36 |
| | | | | 244/58 |
| 8,727,270 B2 * | 5/2014 | Burns | ....................... | F02C 7/32 |
| | | | | 244/58 |
| 10,351,252 B2 * | 7/2019 | Reigner | .................. | F16H 48/05 |
| 2002/0183158 A1 * | 12/2002 | Tsung | ..................... | F16H 48/08 |
| | | | | 475/230 |
| 2006/0183593 A1 * | 8/2006 | Beutin | ....................... | F02C 7/36 |
| | | | | 475/343 |
| 2007/0137219 A1 * | 6/2007 | Linet | ......................... | F02C 7/36 |
| | | | | 60/802 |
| 2009/0007569 A1 * | 1/2009 | Lemmers, Jr. | ............ | F02C 7/36 |
| | | | | 60/792 |
| 2009/0205341 A1 * | 8/2009 | Muldoon | ................... | F02C 7/32 |
| | | | | 60/792 |
| 2012/0153076 A1 * | 6/2012 | Burns | .................... | B64D 41/00 |
| | | | | 244/58 |
| 2013/0247539 A1 | 9/2013 | Hoppe | | |
| 2017/0248081 A1 * | 8/2017 | Roach | ........................ | F02K 3/06 |
| 2018/0045119 A1 * | 2/2018 | Sheridan | ................... | F02K 3/06 |
| 2018/0223740 A1 | 8/2018 | Forest et al. | | |
| 2018/0281979 A1 * | 10/2018 | Reigner | ................... | B64D 35/06 |
| 2018/0283281 A1 | 10/2018 | Veilleux, Jr. et al. | | |
| 2018/0347471 A1 | 12/2018 | Wotzak | | |
| 2019/0211909 A1 * | 7/2019 | Six | .......................... | F16H 48/08 |

* cited by examiner

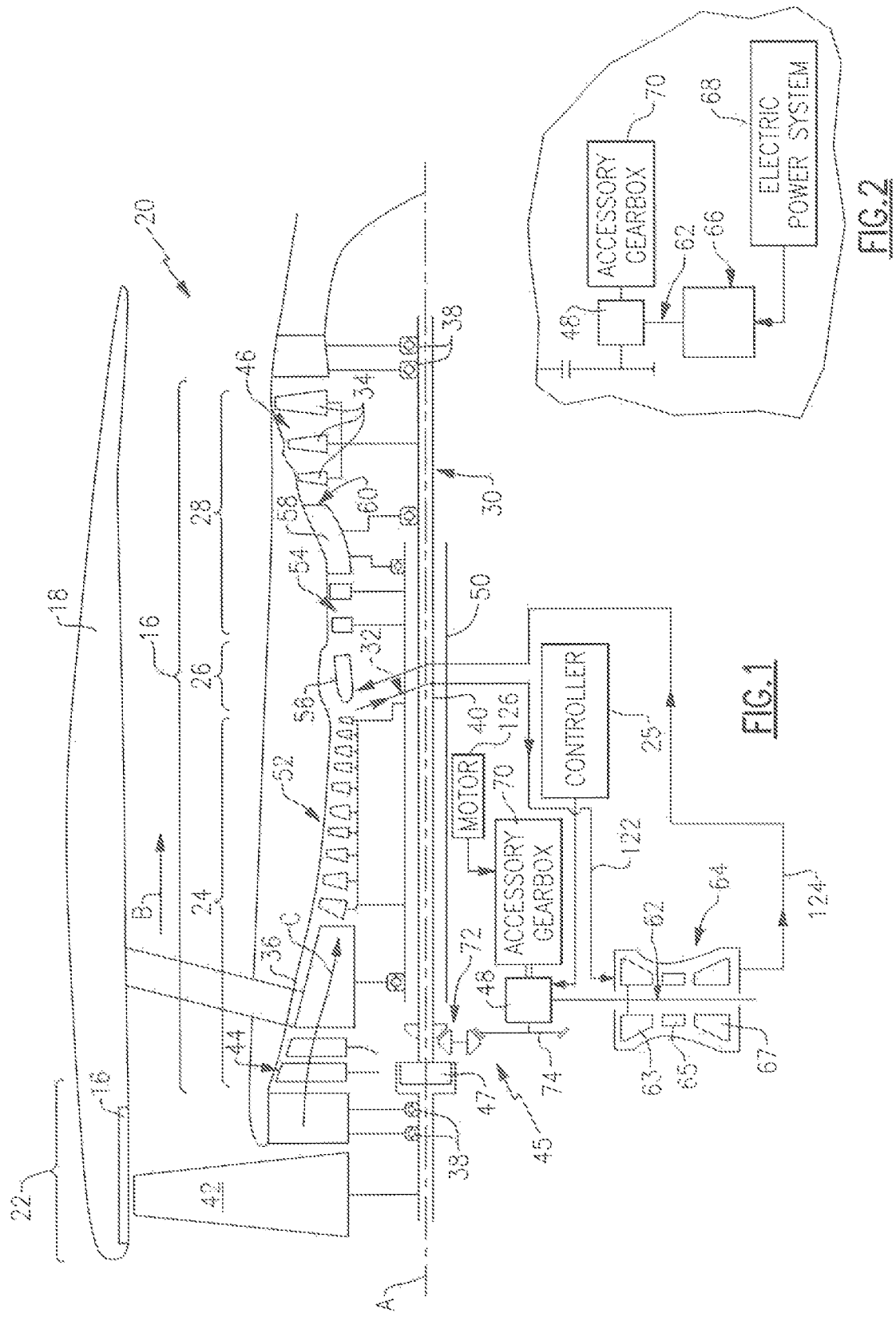

GEARBOX FOR BOOST SPOOL TURBINE ENGINE

BACKGROUND

A turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Operation of a turbine engine may be augmented by additional engines and/or motors to improve overall power generating efficiencies.

SUMMARY

A turbine engine according to an exemplary embodiment of this disclosure includes, among other possible things, a core engine including a first spool and a second spool rotatable about a main engine longitudinal axis, a boost spool powered by a secondary drive system, and an accessory gearbox coupled to the core engine and the boost spool. A differential gear system is coupled between the core engine, the boost spool and the accessory gearbox for distributing power between the boost spool, the core engine and the accessory gearbox.

In a further embodiment of the foregoing turbine engine, the differential gear system includes a first differential gear and a second differential gear both coupled to a differential shaft. The core engine is coupled to the first differential gear and the accessory gearbox is coupled to the second differential gear.

In a further embodiment of any of the foregoing turbine engines, a tower shaft is coupled to one of the first spool or the second spool.

In a further embodiment of any of the foregoing turbine engines, a first gear ratio between a tower shaft gear driven by the tower shaft. The first differential gear is different than a second gear ratio between an accessory drive gear and the second differential gear.

In a further embodiment of any of the foregoing turbine engines, the first differential gear and the second differential gear are supported in a rotatable differential carrier. A boost spool input gear is coupled through a ring gear to drive rotation of the rotatable differential carrier.

In a further embodiment of any of the foregoing turbine engines, a boost spool clutch selectively couples the boost spool to the ring gear. A locking clutch between the tower shaft gear and the accessory gear box directly couples the tower shaft to drive the accessory gear box. A brake is coupled to a first input shaft driven by the tower shaft gear for selectively preventing rotation of the tower shaft.

In a further embodiment of any of the foregoing turbine engines, a boost gear system includes a plurality of intermediate gears supported in a selectively rotatable boost carrier. An inner gear is engaged to the intermediate gears and an outer gear is coupled to the boost spool. Power is transmitted from the outer gear through the intermediate gears to the inner gear when the carrier is fixed, and power is not transmitted between the outer gear to the inner gear when the carrier is allowed to rotate.

In a further embodiment of any of the foregoing turbine engines, in a first operating configuration, the brake is engaged to prevent rotation of the first input shaft. The boost spool drives the accessory gearbox through the ring gear, rotatable differential carrier and a coupling between the second differential gear and the accessory drive gear.

In a further embodiment of any of the foregoing turbine engines, in a second operating configuration, the tower shaft brake is disengaged, the locking clutch is engaged and the boost spool clutch is disengaged such that the tower shaft directly drives the accessory gearbox and the boost spool is decoupled from the differential gear system.

In a further embodiment of any of the foregoing turbine engines, in a third operating configuration, the tower shaft brake is disengaged, the locking clutch is disengaged and the boost spool clutch is engaged such that the boost spool provides an input torque to both the tower shaft and the accessory gearbox.

In a further embodiment of any of the foregoing turbine engines, the secondary drive system comprises one of a gas turbine engine or an electric motor-generator.

A differential gear system for a turbine engine according to an exemplary embodiment of this disclosure include, among other possible things, a differential carrier rotatable about a longitudinal axis, and a first differential gear and a second differential gear coupled to a common differential shaft, the differential shaft rotatable about a differential axis that is transverse to the longitudinal axis. A first drive gear is coupled to the first differential gear at a first gear ratio. A second drive gear is coupled to the second differential gear at a second gear ratio that is different than the first gear ratio. A ring gear is coupled to the differential carrier. An input gear is coupled to the ring gear for driving the differential carrier about the longitudinal axis.

In a further embodiment of the foregoing differential gear system for a turbine engine, a locking clutch selectively couples the first drive gear directly to the second drive gear.

In a further embodiment of any of the foregoing differential gear systems for a turbine engine, the first drive gear is coupled to a tower shaft of the turbine engine, and the second drive gear is coupled to an accessory gearbox and the input gear is coupled to a boost spool.

In a further embodiment of any of the foregoing differential gear systems for a turbine engine, a brake locks rotation of the tower shaft. A boost spool clutch selectively couples the boost spool to drive the ring gear.

A method of operating a turbine engine according to an exemplary embodiment of this disclosure includes, among other possible things, coupling a tower shaft of a core engine, and a boost spool driven by a secondary drive system and an accessory gear box through a differential gear system. Torque is input to both the accessory gearbox and the tower shaft of the core engine from the boost spool driven by the secondary drive system through the differential gear system in one engine operating configuration.

In a further embodiment of the foregoing method of operating a turbine engine, the differential gear system includes a brake for preventing rotation of the tower shaft. Operating the accessory gearbox according to another engine operating configuration includes engaging the brake to prevent rotation of the tower shaft and driving the accessory gear box with the boost spool through the differential gear system.

In a further embodiment of any of the foregoing methods of operating a turbine engine, the differential gear system includes a locking clutch for selectively coupling the tower shaft to directly drive the accessory gear box, and a boost spool clutch for decoupling the boost spool from the differential gear system. Operating the engine according to a further engine operating configuration includes engaging the locking clutch and disengaging the boost spool clutch. The tower shaft directly drives the accessory gearbox and the boost spool is decoupled from the differential gear system.

In a further embodiment of any of the foregoing methods of operating a turbine engine, the boost spool is driven with one of a secondary gas turbine engine or an electric motor-generator.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example turbine engine embodiment.

FIG. 2 is a partial schematic view of another example turbine engine embodiment.

DETAILED DESCRIPTION

Figure 3:
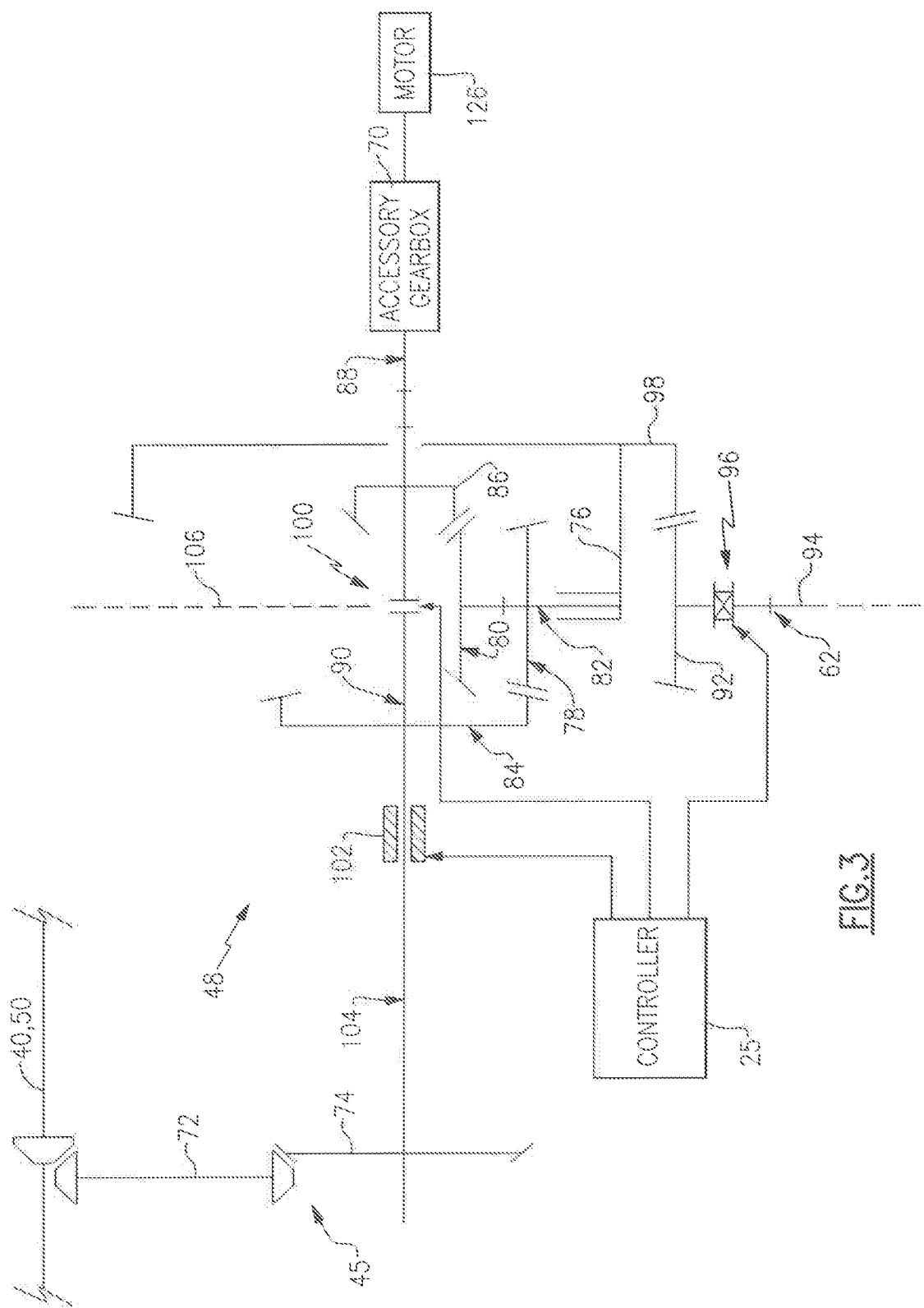
FIG. 3 is a schematic view of an example differential gear system.

FIG. 1 schematically illustrates a turbine engine 20. The turbine engine 20 is disclosed herein as a two-spool turbofan that generally incorporates a fan section 22 and a core engine section 16. The core engine section 16 includes a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a first (or low speed) spool 30 and a second (or high speed) spool 32 mounted for rotation about an engine central longitudinal axis A relative to an engine static structure 36 via several bearing systems 38. It should be understood that the various bearing systems 38 may be provided at different locations and the number of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. The low pressure turbine 46 drives the fan section 22 through a fan drive gear system 47 such that the fan section 22 and the low pressure turbine 46 rotate at different speeds. It will be appreciated that each of the positions of the fan section 22, compressor section 24, combustor section 26, turbine section 28, and fan drive gear system 47 may be varied within the scope and contemplation of this disclosure.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors.

A tower shaft 72 and tower shaft gear 74 couple a shaft of the core engine to a differential gearbox 48. The tower shaft 72 may be coupled to either the inner shaft 40 or the outer shaft 50. In this example, the inner shaft 40 is coupled to the tower shaft gear 74 through the tower shaft 72. The accessory gearbox 70 is driven by an output from a differential gear system 48. The differential gear system 48 is driven by a coupling 45 with the tower shaft 72 of the core engine and by a boost spool 62.

In this disclosed example embodiment, the boost spool 62 is part of a secondary turbine engine 64. The secondary turbine engine 64 includes a compressor 63, combustor 65 and turbine 67 sized to provide limited power to the turbine engine 20. The secondary turbine engine 64 provides additional power to augment operation of the turbine engine 20 during low and/or partial power conditions. The secondary turbine engine 64 draws core airflow from the main engine 20 from a location within the compressor section 24 through and inlet duct 122. In this disclosed example, the duct 122 draws core airflow C from a location between the compressor section 24 and the combustor 56. Exhaust flow is returned to the main engine 20 through an exhaust duct 124. In this disclosed example, the exhaust duct returns the exhaust flow back to a location forward of the combustor 56. It should be appreciated, that other locations for drawings and returning core flow from the main engine 20 could be utilized and are within the scope and contemplation of this disclosure.

The differential gear system 48 couples power input from both the tower shaft 72 and the boost spool 62 to drive the accessory gearbox 70. A controller 25 is provided to operate features of the differential gear system 48 to tailor operation based on engine operating requirements. In this disclosed example, a starter motor 126 is coupled to the accessory gearbox 70 to provide an engine starting capability.

Referring to FIG. 2 with continued reference to FIG. 1, the boost spool 62 may be driven by an electric motor-generator 66. The electric motor-generator 66 is powered and controlled by an electric power system 68 of the aircraft and/or engine. Operation of the motor-generator 66 and the secondary turbine engine 64 augment operation of the turbine engine 20 to improve engine efficiency in low and/or partial power conditions.

Referring to FIG. 3, with continued reference to FIG. 1, the differential gear system 48 enables power and torque to be input from both the core engine 16 through the tower shaft 72 and the boost spool 62. The example differential gear system 48 also enables different output of torque between the tower shaft 72 and the boost spool 62.

The differential gear system 48 includes a first differential gear 78 mounted to a differential shaft 82 and supported within a differential carrier 76. A second differential gear 80 is also mounted to the differential shaft 82. The differential carrier 76 is rotatable about a first axis 104 and the differential shaft 82 is rotatable about a second axis 106 that is transverse to the axis 104. Accordingly, the first and second differential gears 78, 80 rotate about the axis 106 on a common differential shaft 82 and rotate about the first axis 104 transverse to rotation about the axis 106. A first spool gear 84 is coupled to a tower input shaft 90 driven by the tower shaft gear 74. An accessory drive gear 86 is engaged to the second differential gear 80 and drives an input shaft 88 of the accessory gearbox 70.

A first gear ratio is established between the first differential gear 78 and the first spool gear 84. A second gear ratio is established between the second differential gear 80 and the accessory drive gear 86. The first gear ratio and the second gear ratio are established by providing gears of different diameters and/or numbers of teeth. In one disclosed embodiment, the first gear ratio is different than the second gear ratio. In one disclosed embodiment, the first gear ratio is greater than the second gear ratio. It should be appreciated, that the first gear ratio and the second gear ratio are tailored to the speed of the tower shaft 72 and the speed at which application specific parameters require operation of the accessory gearbox 70. The range of either of the first gear ratio to the second gear ratio in one example embodiment is between 1.8:1 and 9.0:1. In another example embodiment, the range of either of the first gear ratio and the second gear ratio is between 5:1 and 8:1. It should be appreciated, that other gear ratios could be utilized and are within the contemplation and scope of this disclosure.

Moreover, in the disclosed differential gear system 48, the first differential gear 78 and the second differential gear 80 are coupled to a common shaft 82 such that the both gears 78, 80 revolve at a common speed about axis 106.

The first and second differential gears 78, 80 are supported within the rotatable differential carrier 76. The differential carrier 76 is coupled to a ring gear 98 and the ring gear 98 is engaged to the boost input gear 92. The boost input gear 92 is coupled to a shaft 94. The shaft 94 is selectively coupled to the boost input gear 92 by a boost clutch 96.

It should be appreciated that the illustrated inputs into the example differential gear system 48 do not reflect the orientation of respective drive systems. For example, the tower shaft gear 74 may not be disposed along the axis 104. Instead, the tower shaft coupling 45 may be spaced apart from the axis 104 and a gear coupling such as that indicated at 45 in FIG. 1 may be provided to communicate the input torque and power. Similarly, the boost spool 62 may not be disposed along the axis 106. However, a suitable gear coupling might be provided to communicate power to the gear system 48 as is schematically shown. Accordingly, it is within the contemplation of this disclosure that additional gear coupling systems may be incorporated to communicate power from the different inputs to the differential gear system 48.

A brake 102 is coupled to a tower input shaft 90 to prevent rotation of the tower shaft 72. A locking clutch 100 is provided between the tower input shaft 90 and the shaft 88 that provides an input to the accessory gearbox 70. Engaging the locking clutch 100 enables the tower shaft 72 to directly drive the accessory gearbox 70. Directly driving the accessory gearbox 70 with the tower shaft 72 bypasses the differential gear system 48. Alternatively, a brake on the differential shaft 82 may be used to the same effect as the differential locking clutch described.

In operation, the boost spool 62 is driven to augment power to the engine 20 in low and partial power conditions. In the configuration of the differential gear system shown in FIG. 3, the boost spool 62 is driving the ring gear 98 to rotate the differential carrier 76. The tower shaft gear 72 is also rotating. In the configuration shown in FIG. 3, the controller 25 disengages the differential locking clutch 100 and the tower shaft brake 102. The controller 25 engages the boost clutch 96 such that torque input by the boost spool 62 is communicated to both the accessory gearbox 70 and the tower shaft 72 to augment engine operation.

Figure 4:
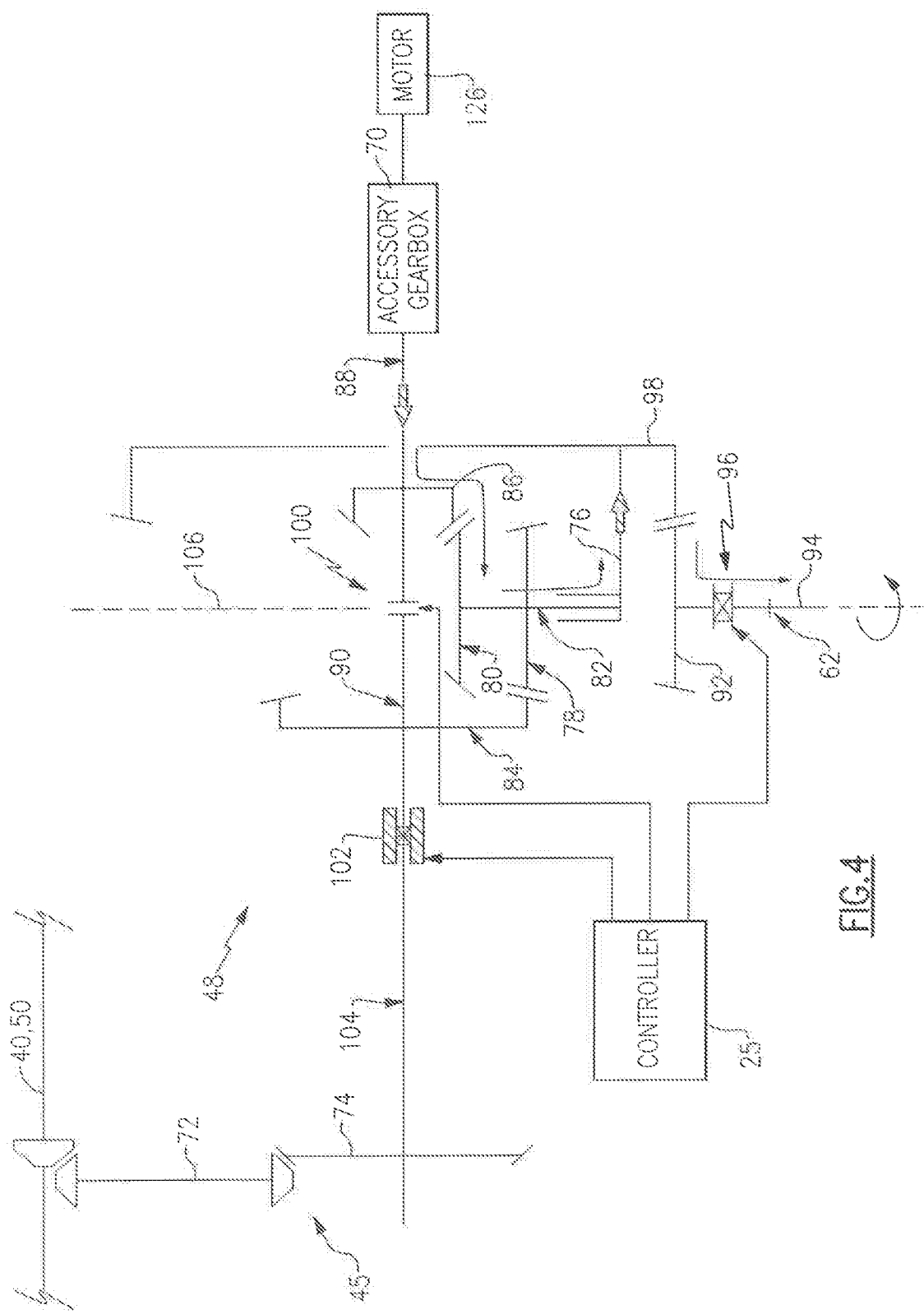
FIG. 4 is a schematic view of the example differential gear system in a start operating configuration.

Referring to FIG. 4, another operational configuration of the disclosed example differential gear system 48 is shown and is utilized for starting the engine 20. In this configuration, the controller 25 engages the brake 102 to prevent rotation of the tower shaft 72. The controller 25 commands engagement of the boost clutch 96 and disengages the locking clutch 100. The starter motor 126 is coupled to the accessory gearbox 70 to rotate the shaft 94 through the differential gear system 48 to start the secondary engine 64 that drives the boost spool 62. All the power and torque input from the starter motor 126 drives the boost spool 62 until the secondary engine combustor 65 can be ignited to generate a high energy exhaust gas flow that expands through the turbine 67. Power from the accessory gearbox 70 is routed through the second differential gear 80, carrier 76, and ring gear 98 to drive the boost spool 62.

Once the secondary engine 64 is started, the starter motor 126 is shut off and all the power and torque input from the boost spool 62 is routed to the drive the accessory gearbox 70 to maintain ground idle. Power from the boost spool 62 is routed through ring gear 98 and the differential carrier 76 to drive the accessory drive gear 86 with the second differential gear 80. Once the engine 20 is idling, the brake 102 may be released to enable the high energy exhaust gas flow through the outlet duct 124 to rotate one of the spools 30, 32 and operate the main engine 20 for higher power operation.

Figure 5:
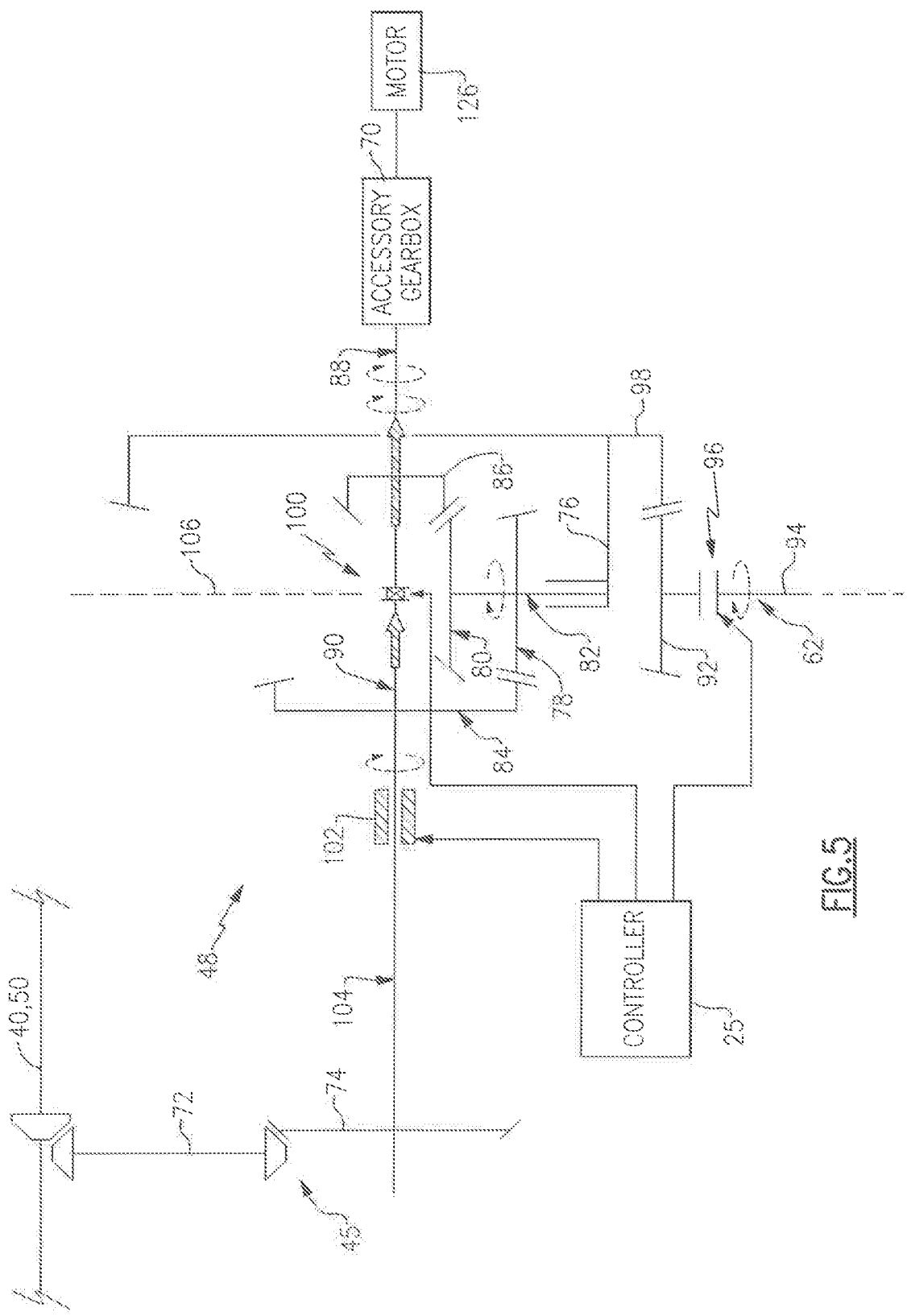
FIG. 5 is a schematic view of the example differential gear system in another operating configuration.

Referring to FIG. 5, another configuration of the differential gear system 48 is shown with the locking clutch 100 engaged and the boost clutch 96 disengaged. In this orientation, the tower shaft coupler 45 powers the accessory gearbox 70. The boost spool 62 is decoupled and does not provide additional power. The configuration shown in FIG. 5 may be utilized when the engine 20 is operating at more efficient power settings that do not require augmentation from the boost spool 62.

Figure 6:
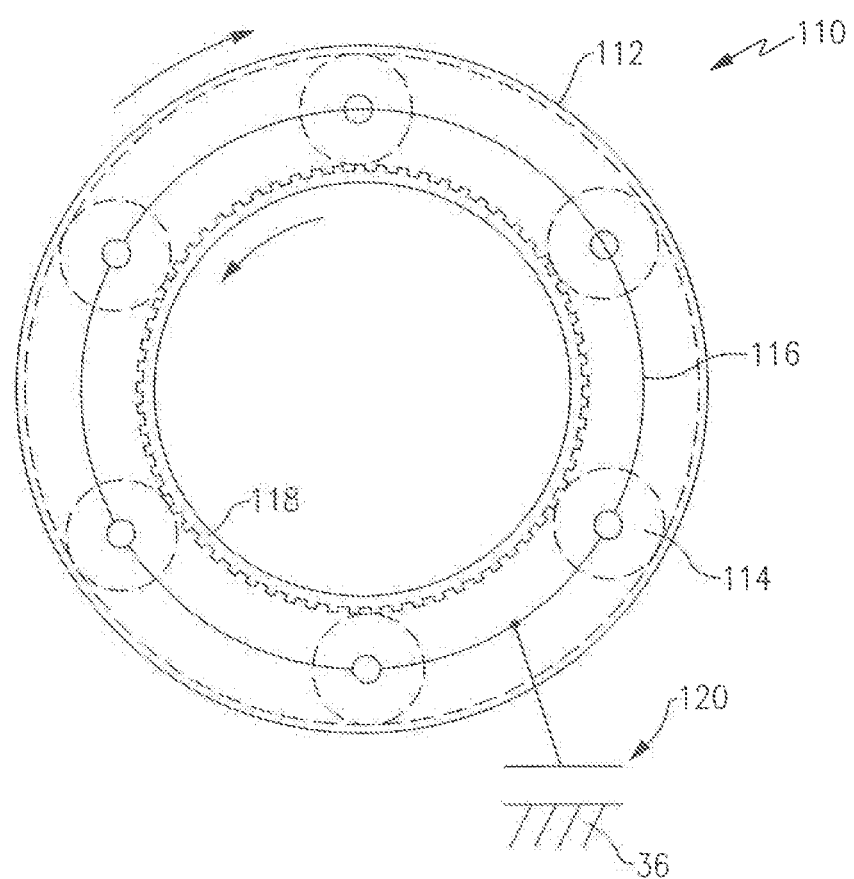
FIG. 6 is a schematic view of an example decoupling gear box embodiment.

Referring to FIG. 6, a boost gear system 110 is shown and may be utilized instead of the boost clutch 96. The example boost gear system 110 is an epicyclic gear system that includes a plurality of intermediate gears 114 supported in a selectively rotatable carrier 116. The intermediate gears 114 are coupled to an inner output gear 118 that is coupled to drive the differential gear system 48. The intermediate gears 114 are circumscribed and coupled to an outer gear 112 that is driven by the boost spool 62.

In operation when power from the boost spool 62 is desired to augment engine operation, the carrier 116 is fixed by a mechanical coupling 120 to prevent rotation. The boost gear system 110 operates as a star gear system. Power is thereby transmitted from the outer gear 112, through the intermediate gears 114 to drive the inner output gear 118. When power from the boost spool 62 is not desired, the mechanical coupling 120 is released and the carrier 116 will rotate freely and not communicate power to the inner output gear 118. It should be appreciated, that the boost gear system 110 is shown schematically and may be orientated in alternate configurations to fit within different design spaces and performance requirements. Moreover, the input and output into the boost gear system 110 may be modified to accommodate other engine and gear system requirements.

The disclosed differential gear system 48 enables the tailoring of multiple inputs and outputs to augment engine operation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine comprising:
a core engine including a first spool and a second spool rotatable about a main engine longitudinal axis;
a boost spool powered by a secondary drive system;
an accessory gearbox coupled to the core engine and the boost spool;
a tower shaft is coupled to one of the first spool or the second spool;
a differential gear system coupled between the core engine, the boost spool and the accessory gearbox for distributing power between the boost spool, the core engine and the accessory gearbox, the differential gear system including a first differential gear and a second differential gear both coupled to a differential shaft, the core engine is coupled to the first differential gear and the accessory gearbox is coupled to the second differential gear, the first differential gear and the second differential gear are supported in a rotatable differential carrier and a boost spool input gear is coupled through a ring gear to drive rotation of the rotatable differential carrier, wherein a first gear ratio between a tower shaft gear driven by the tower shaft and the first differential gear is different than a second gear ratio between an accessory drive gear and the second differential gear.

2. The turbine engine as recited in claim 1, including a boost spool clutch for selectively coupling the boost spool to the ring gear, a locking clutch between the tower shaft gear and the accessory gear box for directly coupling the tower shaft to drive the accessory gear box and a brake coupled to a first input shaft driven by the tower shaft gear for selectively preventing rotation of the tower shaft.

3. The turbine engine as recited in claim 2, including a boost gear system including a plurality of intermediate gears supported in a selectively rotatable boost carrier, an inner gear engaged to the intermediate gears and an outer gear coupled to the boost spool, wherein power is transmitted from the outer gear through the intermediate gears to the inner gear when the carrier is fixed and power is not transmitted between the outer gear to the inner gear when the carrier is allowed to rotate.

4. The turbine engine as recited in claim 3, wherein in a first operating configuration, the brake is engaged to prevent rotation of the first input shaft and the boost spool drives the accessory gearbox through the ring gear, rotatable differential carrier and a coupling between the second differential gear and the accessory drive gear.

5. The turbine engine as recited in claim 4, wherein in a second operating configuration, the tower shaft brake is disengaged, the locking clutch is engaged and the boost spool clutch is disengaged such that the tower shaft directly drives the accessory gearbox and the boost spool is decoupled from the differential gear system.

6. The turbine engine as recited in claim 5, wherein in a third operating configuration, the tower shaft brake is disengaged, the locking clutch is disengaged and the boost spool clutch is engaged such that the boost spool provides an input torque to both the tower shaft and the accessory gearbox.

7. The turbine engine as recited in claim 1, where the secondary drive system comprises one of a gas turbine engine or an electric motor-generator.

8. A differential gear system comprising:
a differential carrier rotatable about a longitudinal axis;
a first differential gear and a second differential gear coupled to a common differential shaft, the differential shaft rotatable about a differential axis that is transverse to the longitudinal axis;
a first drive gear coupled to the first differential gear at a first gear ratio;
a second drive gear coupled to the second differential gear at a second gear ratio that is different than the first gear ratio;
a ring gear coupled to the differential carrier; and
an input gear coupled to the ring gear for driving the differential carrier about the longitudinal axis; and
a locking clutch for selectively coupling the first drive gear directly to the second drive gear.

9. The differential gear system as recited in claim 8, wherein the first drive gear is configured to be coupled to a tower shaft of a turbine engine, the second drive gear is coupled to an accessory gearbox and the input gear is coupled to a boost spool.

10. The differential gear system as recited in claim 9, including a brake for locking rotation of the tower shaft and a boost spool clutch for selectively coupling the boost spool to drive the ring gear.

11. A method of operating a turbine engine comprising:
coupling a tower shaft of a core engine, a boost spool driven by a secondary drive system and an accessory gear box through a differential gear system; and
inputting torque to both the accessory gearbox and the tower shaft of the core engine from the boost spool driven by the secondary drive system through the differential gear system in one engine operating configuration, wherein the differential gear system includes a brake for preventing rotation of the tower shaft and operating the accessory gearbox according to another engine operating configuration includes engaging the brake to prevent rotation of the tower shaft and driving the accessory gear box with the boost spool through the differential gear system.

12. The method as recited in claim 11, wherein the differential gear system includes a locking clutch for selectively coupling the tower shaft to directly drive the accessory gear box and a boost spool clutch for decoupling the boost spool from the differential gear system and operating the engine according to a further engine operating configuration includes engaging the locking clutch and disengaging the boost spool clutch such that the tower shaft directly drives the accessory gearbox and the boost spool is decoupled from the differential gear system.

13. The method as recited in claim 12, including driving the boost spool with one of a secondary gas turbine engine or an electric motor-generator.

\* \* \* \* \*